United States Patent [19]

Kohsaka et al.

[11] Patent Number: 5,206,302

[45] Date of Patent: Apr. 27, 1993

[54] STYRENE-BASED RESIN COMPOSITION

[75] Inventors: Tuneaki Kohsaka, Ichihara; Kazuo Sato, Sodegaura; Yutaka Tsubokura, Ichihara; Takashi Kanezaki, Sodegaura, all of Japan

[73] Assignee: Idemitsu Petrochemical Company Limited, Tokyo, Japan

[21] Appl. No.: 496,908

[22] Filed: Mar. 21, 1990

[30] Foreign Application Priority Data

Mar. 31, 1989 [JP] Japan ................................ 1-78142

[51] Int. Cl.$^5$ .......................................... C08F 279/02
[52] U.S. Cl. ..................................... 525/316; 525/314; 525/315; 525/282; 525/285
[58] Field of Search ...................... 525/315, 316, 314

[56] References Cited

U.S. PATENT DOCUMENTS 4,972,024 11/1990 Iwamoto et al. ..................... 525/314

*Primary Examiner*—James J. Seidleck
*Assistant Examiner*—Vasu S. Jagannathan
*Attorney, Agent, or Firm*—Wyatt, Gerber, Burke and Badie

[57] ABSTRACT

The rubber-modified styrene-based resin composition, which is a composite of a styrene-based resin as a continuum of the matrix phase and a diene-based rubbery polymer as a dispersed particulate phase in the matrix, is characterized by the parameters including an average particle diameter of the particles of the rubbery polymer in the range from 0.08 to 1.00 $\mu$m, peripheral parameter thereof in the range from 0.1 to 2.5 $(\mu m)^{-1}$. (% by weight)$^{-1}$ and relaxation time $T_2$ thereof in the range from 300 to 2000 $\mu$ seconds as the determinant factors of the moldability of the resin composition as well as the impact strength and surface gloss of the shaped articles prepared from the composition.

3 Claims, No Drawings

STYRENE-BASED RESIN COMPOSITION

BACKGROUND OF THE INVENTION

The present invention relates to a novel styrene-based resin composition. More particularly, the invention relates to a rubber-modified styrene-based resin composition composed of a styrene-based resin forming the matrix phase and a diene-based rubbery polymer as the discrete phase dispersed in the matrix and capable of giving a molded article having excellent surface gloss and a high impact strength or, in particular, planar impact strength to he suitable as a material of parts of office-automation instruments and household electric appliances as well as sheets and the like.

It is a widely practiced technology that, with an object to improve the impact strength of a styrene-based resin, e.g., polystyrene, that the resin is blended with a rubbery polymer or styrene monomer is polymerized in the presence of a rubbery polymer so as to effect partial graft polymerization of the monomer on to the molecules of the rubbery polymer, the remainder of the monomer being polymerized into homopolymeric polystyrene, so that the resulting polymeric product is a so-called HI-grade polystyrene or a rubber-modified polystyrene-based resin composition which is a composite of a polystyrene and a graft copolymer of styrene on the molecules of the rubbery polymer.

The rubbery polymer in such a rubber-modified polystyrene resin composition is usually dispersed in the matrix of the styrene-based resin forming the dispersed phase. It is well known that the impact strength, rigidity and surface gloss of a shaped article prepared from the resin composition is greatly influenced by the particle size of the thus dispersed particles. For example, a decrease in the particle size of the dispersed rubbery polymer results, as a trend, in an improvement in the rigidity and surface gloss while the impact strength is rather decreased. Thus, substantially no improvement can be obtained in the impact strength of the molded articles when the particle size of the rubbery polymer is smaller than a certain value.

Accordingly, the dispersed particles of the rubbery polymer in conventional rubber-modified polystyrene resin compositions have a particle diameter of at least 1 $\mu$m or, usually, in the range from 1 to 10 $\mu$m. Such a particle diameter is somewhat larger than the optimum particle diameter which would give the most remarkable improvement in the rigidity and surface gloss of the molded articles so that the resin composition is under limitations relative to the fields of application.

Various attempts and proposals have been recently made with an object to obtain a good balance between the impact strength and surface gloss in the molded articles of rubber-modified polystyrene resin compositions. For example, German Patent Laid-Open Publication No. 3345377 discloses a molding material based on a high-impact polystyrene containing particles of a rubbery polymer in a controlled particle diameter and structure. Further, Japanese Patent Kokai No. 63-199717 and No. 63-207803 disclose rubber-modified styrene-based copolymers in which the type of the rubbery polymer is specified and the particle diameter of the dispersed particles and the grafting ratio on the rubbery polymer are controlled.

Although these prior art methods are not without improvements in the balance of the impact strength and surface gloss of the molded articles of the molding materials or copolymers, the improvements thus far obtained are far from satisfactory so that it is eagerly desired to develop a styrene-based resin composition of high-impact grade capable of giving molded articles having well balanced impact strength and surface gloss.

SUMMARY OF THE INVENTION

The present invention accordingly has an object to provide a novel and improved rubber modified styrene based resin composition of the high-impact grade capable of giving molded articles having well balanced impact strength and surface gloss by overcoming the problems and disadvantages in the conventional high-impact polystyrene resins. The invention completed with the above mentioned object is based on the unexpected discovery obtained as a result of the extensive investigations undertaken by the inventors that the above mentioned object can be well achieved by controlling not only the particle diameter but also the peripheral parameter and the relaxation time $T_2$ of the dispersed particulate phase of the rubbery polymer.

Thus, the present invention provides a rubber-modified styrene-based resin composition comprising a styrene-based resin as a continuum of the matrix phase and a diene-based rubbery polymer as a dispersed particulate phase in the matrix, in which the particles of the rubbery polymer have an average particle diameter in the range from 0.08 to 1.00 $\mu$m, peripheral parameter in the range from 0.1 to 2.5 $(\mu m)^{-1}$. (% by weight)$^{-1}$ and relaxation time $T_2$ in the range from 300 to 2000 $\mu$ seconds.

DETAILED DESCRIPTION OF THE PREFERRED EMBODIMENTS

The styrene-based resin forming the matrix phase of the inventive resin composition is typically a polystyrene but other homopolymers of various kinds of aromatic monovinyl monomers and copolymers thereof with other types of monomers copolymerizable with styrene or aromatic monovinyl monomers also can be the styrene-based resin in the invention.

Examples of the above mentioned aromatic monovinyl monomers include styrene, $\alpha$-alkyl-substituted styrenes, e.g., $\alpha$-methyl styrene, $\alpha$-ethyl styrene and $\alpha$-methyl-4-methyl styrene, nucleus-substituted alkyl styrenes, e.g., 2-methyl styrene, 3-methyl styrene, 4-methyl styrene, 2,4-dimethyl styrene, ethyl styrenes, 2-tert-butyl styrene and 4-tert-butyl styrene, nucleus-substituted halogenostyrenes, e.g., 2-chlorostyrene, 3-chlorostyrene, 4-chlorostyrene, 4-bromostyrene, dichlorostyrenes, dibromostyrenes, trichlorostyrenes, tribromostyrenes, tetrachlorostyrenes, tetrabromostyrenes and 2-methyl-4-chlorostyrene, 4-hydroxy styrene, 2-methoxy styrene, vinyl naphthalenes and the like, of which styrene and $\alpha$-methyl styrene are preferred. These aromatic monovinyl monomers can be used either singly or as a combination of two kinds or more according to need.

Examples of the preferable monomers copolymerizable with the above named aromatic monovinyl monomers include cyano-containing vinyl compounds, e.g., acrylonitrile, methacrylonitrile, fumaronitrile, maleonitrile and $\alpha$-chloroacrylonitrile, of which acrylonitrile is more preferable. These cyano-containing comonomers can be used either singly or as a combination of two kinds or more according to need. It is important and advantageous that the copolymerization is performed with a monomer mixture in which the amount of the comonomer copolymerized with the styrene monomer is such that the resulting copolymer contains at least 55% by weight or, preferably, at least 60% by weight of the monomeric moiety derived from the styrene monomer. When the weight fraction of the styrene moiety in the copolymer is too small, the copolymer would suffer undesirable decrease in the thermal stability and flowability in molding.

It is further optional according to need that the styrene-based copolymer contains, besides the moieties derived from the styrene monomer and the cyano-containing vinyl monomer, one kind or more of the monomeric moieties derived from other types of copolymerizable monomers including, for example, anhydrides of unsaturated dibasic carboxylic acids, e.g., maleic acid, itaconic acid, hydroxymaleic acid, citraconic acid, phenyl maleic acid, aconitic acid, ethyl maleic acid and chloromaleic acid, maleimide compounds, e.g., maleimide and N-phenyl maleimide, unsaturated monobasic carboxylic acids, e.g., acrylic acid and methacrylic acid, and esters of acrylic and methacrylic acids, e.g., methyl acrylate and methyl methacrylate, of which the moiety derived from the maleic anhydride is particularly preferable in respect of giving certain improvements to the copolymer. These comonomeric moieties can be contained in the copolymer either singly or as a combination of two kinds or more according to need in a weight fraction not to exceed 35% by weight.

The rubbery polymer forming the particulate dispersed phasse in the inventive resin composition is a diene-based rubbery polymer which is not particularly limitative. Any of diene-based rubbery polymers conventionally used in rubber-modified styrene-based resin compositions can be used here. Examples of the suitable rubbery polymers include, for example, natural rubber and synthetic rubbers such as polybutadiene rubbers, polyisoprene rubbers, block- or random-copolymeric rubbers of styrene and butadiene, block- or random-copolymeric rubbers of styrene and isoprene and butyl rubbers as well as graft-copolymeric rubbers obtained by the graft-copolymerization of styrene on to the above named rubbery polymers. These rubbery polymers can be used either singly or as a combination of two kinds or more according to need. Preferably, the rubbery polymer is a block-copolymeric rubber of styrene and butadiene, polybutadiene or a combination thereof in which the weight fraction of the styrene moiety is in the range from 20 to 50% by weight.

The preparation method of the inventive rubber-modified styrene-based resin composition is not particularly limitative and can be any of conventional methods used in the preparation of rubber-modified styrene-based resin compositions. For example, the resin composition can be obtained by conducting homopolymerization of the aromatic monovinyl monomer or copolymerization thereof with other comonomer or comonomers in the presence of the diene-based rubbery polymer. The type of the (co)polymerization process is also not particularly limitative and can be conventional including emulsion polymerization, bulk polymerization, solution polymerization and suspension polymerization in a batch-wise or continuous process as well as a multi-stage polymerization method such as the bulk-suspension two-step polymerization method, of which the methods of continuous bulk or solution polymerization are preferred.

In the following, an example is described for a preferable preparation method of the inventive resin composition by the bulk or solution polymerization method in a continuous process. In the first place, the aromatic monovinyl monomer, e.g., styrene, or a monomeric mixture thereof with other comonomers, e.g., cyano-containing vinyl monomers, is admixed with the diene-based rubbery polymer which is dissolved therein at a temperature, for example, in the range from 20° to 70° C. The solution is introduced into a polymerization reactor equipped with a stirrer or, preferably, to the first reactor of a multi-stage series of polymerization reactors and polymerization of the monomer or monomers is effected therein by heating, usually, at a temperature in the range from 70° to 150° C. It is preferable that the conversion of the monomer or monomers into polymer in the first of the series of the reactors is in the range from 0.5 to 3.0 times by weight based on the amount of the rubbery polymer dissolved in the monomer mixture. When this conversion is lower than 0.5 time, difficulties may be caused in the temperature control in the second and subsequent reactors due to an increase in the load for the removal of heat of polymerization. When this conversion is higher than 3.0 times, on the other hand, the viscosity of the polymerization mixture is unduly increased already in the first reactor so as to cause coarsening of the rubber particles due to incomplete mixing resulting in a resin composition which gives a shaped article having a decreased surface gloss. The polymerization mixture discharged out of the last in the series of the reactors is subjected to a step for the recovery of the solid material from the volatile matters such as the unpolymerized monomers, solvents, if used, and the like or the so-called devolatilization treatment so that the desired resin composition can be obtained. It is desirable that the conversion of the monomer or monomers into polymer in the polymerization mixture discharged out of the last reactor is at least 65% by weight. When this final conversion is too low, the rubber particles have not yet reached stabilization so that the particle configuration may be subject to destruction in the subsequent devolatilization treatment resulting in a resin composition which gives a shaped article having a decreased surface gloss.

In the above described process, the rubbery polymer is introduced into the first of the series of the reactors as being dissolved in the monomer or monomer mixture while a portion of the monomer or monomer mixture as well as other additives such as the polymerization initiators, chain transfer agents or molecular weight-controlling agents and the like used according to need can be introduced into the reactor at any stage in the series of the reactors.

The process of devolatilization is performed under a reduced pressure of, usually, 50 mmHg of below or, preferably, 30 mmHg or below at a temperature in the range, usually, from 200° to 300° C. or, preferably, from 230° to 290° C. or, more preferably, from 240° to 280° C. It was found that the temperature in this devolatilization treatment has an influence on the relaxation time $T_2$.

As is mentioned above, the rubber-modified styrene-based resin composition of the invention is prepared preferably by the continuous-process solution or bulk polymerization and the diene-based rubbery polymer is dispersed in the form of discrete particles in the matrix of the styrene-based resin. It should be noted that the resin composition may have no satisfactory properties when it is prepared by the so-called grafting emulsion copolymerization in which a rubber latex is admixed with the aromatic monovinyl monomer or a mixture thereof with other comonomers including the cyano-containing vinyl monomers.

Examples of the above mentioned molecular weight-controlling agent used according to need in the above described polymerization process include, for example, mercaptans, terpenes and halogenated hydrocarbons such as α-methyl styrene dimer, n-dodecyl mercaptan, tert-dodecyl mercaptan, 1-phenylbutene-2, fluorene, dipentene, chloroform and the like.

Further, the polymerization initiator, which is used also according to need in the process of polymerization, is selected from organic peroxides including peroxy ketal compounds, e.g., 1,1-bis(tert-butylperoxy) cyclohexane and 1,1-bis(tert-butylperoxy)-3,3,5-trimethyl cyclohexane, dialkyl peroxides, e.g., dicumyl peroxide, di-tert-butyl peroxide and 2,5-dimethyl-2,5-di(tert-butylperoxy) hexane, diaryl peroxides, e.g., benzoyl peroxide and 3-toluoyl peroxide, peroxy dicarbonates, e.g., dimyristylperoxy dicarbonate, peroxy ester compounds, e.g., tert-butylperoxy isopropyl carbonate, ketone peroxides, e.g., cyclohexanone peroxide, hydroperoxides, e.g., p-menthane hydroperoxide, and so on.

It is preferable that the resin composition of the invention consists of from 70 to 95% by weight of the styrene-based resin and from 30 to 5% by weight of the diene-based rubbery polymer. When the content of the rubbery polymer is too low, the impact strength of an article shaped from the resin composition cannot be fully improved. When the content thereof is too high, on the other hand, the flowability of the resin composition is undesirably decreased not to give a shaped article having an increased surface gloss.

It is essential in the resin composition of the invention that the particles of the rubbery polymer as the dispersed phase have an average particle diameter in the range from 0.08 to 1.00 μm or, preferably, from 0.10 to 0.70 μm, a peripheral parameter in the range from 0.1 to 2.5 $(\mu m)^{-1} \cdot (\% \text{ by weight})^{-1}$ or, preferably, from 0.3 to 2.0 $(\mu m)^{-1} \cdot (\% \text{ by weight})^{-1}$, and a relaxation time $T_2$ in the range from 300 to 2000 μ seconds or, preferably, from 400 to 1800 μ seconds. The peripheral parameter here implied is a value obtained from a transmission-type electron microscopic photograph showing the state of the dispersed rubber particles in the matrix of the styrene-based resin. Namely, the value is obtained from the total of the peripheral lengths of the rubber particles in a unit area given in the unit of $(\mu m)^{-1}$ divided by the content of the rubbery polymer in the composition given in the unit of % by weight. The relaxation time $T_2$ here implied is the value of the spin-spin relaxation time of the rubbery constituent in the resin composition as determined by the Hahn echo method (90°−π−180° pulse method) at 30° C. by using a pulse NMR apparatus under the conditions of the measuring frequency of 90 MHz and 90° pulse width of 1.5 to 2.0 μ seconds with hydrogen nuclei as the target.

When the average particle diameter of the dispersed rubber particles is too small, the resin composition cannot give a shaped article having a fully improved impact strength. When the average particle diameter thereof is too large, on the other hand, the surface gloss of the shaped article of the resin composition is undesirably low. When the peripheral parameter and the relaxation time $T_2$ are outside the above defined respective ranges, the impact strength of the shaped article of the resin composition may not be high enough. Each of these three parameters can be controlled by appropriately selecting the velocity of agitation in each of the series of the reactors and the temperature in the devolatilization treatment of the polymerization mixture discharged out of the last reactor in the series.

It is of course optional according to need that the styrene-based resin composition of the present invention is processed into a molding compound with admixture of various kinds of additives conventionally used in styrene-based resin compositions including lubricants, antioxidants, plasticizers, flame retardants, photostabilizers, coloring agents and the like. It is further optional that a composite molding compound is prepared by admixing the inventive resin composition with fillers such as fibrous reinforcing fillers, e.g., glass fibers, and inorganic powdery fillers.

Examples of the above mentioned lubricants include stearic acid, behenic acid, stearoamide, methylene bis-stearoamide, ethylene bisstearoamide and the like. Examples of the above mentioned antioxidants include those of the hindered phenol-type such as 2,6-di-tert-butyl-4-methyl phenol, stearyl-β-(3,5-di-tert-butyl-4-hydroxy phenyl) propionate, triethylene glycol bis-3-(3-tert-butyl-4-hydroxy-5-methyl phenyl) propionate and the like and phosphorus-containing ones such as tri(2,4-di-tert-butyl phenyl) phosphite, 4,4'-butylidene bis(3-methyl-6-tert-butylphenyl-di-tridecyl) phosphite and the like. Examples of the plasticizers include mineral oils and polyethylene glycols. Examples of the preferable flame retardants include combinations of an organic bromine compound, e.g., tetrabromo bisphenol A, decabromo diphenyl oxide, brominated polycarbonates and the like, and antimony trioxide.

It is optional that the molding compound of the inventive resin composition is compounded with one or more of other polymeric resins such as ABS resins, polyvinyl chloride, styrene-acrylonitrile copolymeric resins, polycarbonate resins, polybutylene terephthalate, polyethylene terephthalate, nylon 6, nylon 11, nylon 12, polyphenylene oxide, polyphenylene sulfide and the like.

In the following, a more detailed description is given by way of examples to illustrate the resin composition of the present invention although the scope of the invention is never limited thereto. In the examples, each of the items for the evaluation of the resin composition was conducted according to the method or standard given below.

(1) Melt index MI Measurements were made according to ISO R-1133.

(2) Surface gloss of shaped articles Measurements were made according to JIS K 7105.

(3) Planar impact strength a) Test piece: 75 mm×75 mm×3 mm dimensions prepared by injection molding b) Testing machine: Drop-weight tester Model RDT 5000 manufactured by Rheometrics Co.

c) Testing conditions: 3.76 kg of overall dart load; ½ inch diameter of dart point; 2 inches diameter of test piece holder bench; hitting point of dart at the center of the test piece; and 1.5 meters/second of hitting velocity (4) Average diameter of rubber particles A transmission-type electron microscope was used to take a photograph showing the dispersion of the rubber particles in an ultrathin section of the composition having a thickness of 0.1 μm as prepared by using an ultramicrotome from the composition stained with osmium tetraoxide. The diameters $D_i$ in μm of the image profiles on the photograph of at least 1500 rubber particles having a diameter of 0.02 μm or larger were determined by using an image analyzer and the area-average particle diameter $D_s$ in μm was calculated by using the equation $$D_s \, \mu m = (\Sigma n_i D_i^3)/(\Sigma n_i D_i^2),$$

in which $n_i$ is the number of the particles having a diameter of $D_i$ μm. The particle diameter here implied is the largest distance between any two points on the circumference of the image of a rubber particle.

(5) Peripheral parameter $C_i$

An electron microscopic photograph was taken in the same manner as above and the overall value L in μm of the peripheral lengths of the images of the rubber particles within an area of A μm² was determined by using an image analyzer to calculate the peripheral density $C_d$ in $(\mu m)^{-1}$ which is given by $C_d$, $(\mu m)^{-1} = L/A$.

Separately, the concentration of the dienic constituent in % by weight in the resin composition was determined by the $^{13}$C-NMR spectrometry. Thus, a $^{13}$C-NMR spectrum of the sample was obtained by the proton-gated decoupling method after elimination of the nuclear Overhauser effect (NOE) by using an NMR apparatus at a frequency of 200 MHz under the conditions of deuterated chloroform $CDCl_3$ as the solvent, solute concentration of 16% by weight, measuring temperature of 23° C., pulse width of 6.9 μ seconds (45°) and width of spectrum range of 10,000 Hz, from which the concentration of the dienic constituent in % by weight in the sample was calculated from the comparison of the integrated intensities of the signals in the spectrum inherent in the styrene moiety and the diene moiety. The peripheral parameter $C_i$ in $(\mu m)^{-1}$. (% by weight)$^{-1}$ is given as the ratio of the peripheral density $C_d$ in $(\mu m)^{-1}$; to the above mentioned content of the dienic constituent in % by weight.

(6) Relaxation time $T_2$

The relaxation time $T_2$ here implied is the value of the spin-spin relaxation time of the rubbery constituent in the resin composition as determined by the Hahn echo method (90°−τ−180° pulse method) at 30° C. by using a pulse NMR apparatus under the conditions of the measuring frequency of 90 MHz and 90° pulse width of 1.5 to 2.0 μ seconds with hydrogen nuclei as the target.

EXAMPLE 1

A polymerization mixture composed of:
- 10.0% by weight of a styrene-butadiene copolymer containing 22% by weight of the styrene moiety (ZLS-01, a product by Nippon Zeon Co.);
- 83.7% by weight of styrene monomer;
- 5.0% by weight of ethyl benzene;
- 0.01% by weight of n-dodecyl mercaptan;
- 0.09% by weight of an antioxidant (Irganox 1076, a product by Ciba Geigy Co.):
- 1.00% by weight of a mineral oil (a product by Idemitsu Kosan Co.); and
- 0.20% by weight of a silicone oil (a product by Toray Silicone Co.)

was continuously introduced at a constant feed rate of 5.8 liters per hour into the first polymerization reactor of a series of reactors having a capacity of 7.8 liters and equipped with a stirrer having anchor-type blades rotated at 100 rpm. The first reactor was kept at a temperature of 140° C. so that the conversion of the styrene monomer into polymer in the polymerization mixture discharged out of the first reactor was 21%.

The polymerization mixture coming out of the first polymerization reactor was successively introduced into the second and the third in the series of reactors, each having a capacity of 11.0 liters and equipped with a stirrer having anchor-type blades rotated at 150 rpm and 50 rpm, respectively, to continue the polymerization reaction at 145° C. and 160° C. in the second and third reactors, respectively. The conversion of the styrene monomer into polymer in the polymerization mixture discharged out of the third reactor was 72%. The polymerization mixture was subjected to the devolatilization treatment in a vacuum vessel under a pressure of 10 mmHg at 260° C. to be freed from volatile matters followed by pelletization of the rubber-modified styrene-based resin composition. Table 1 below shows the results obtained in the evaluation tests of the thus obtained resin composition.

EXAMPLES 2 AND 3

The experimental procedure in each of Examples 2 and 3 was substantially the same as in Example 1 except that the temperature in the devolatilization treatment was 280° C. and 245° C., respectively. Table 1 below also shows the results obtained in the evaluation tests of the thus obtained resin compositions.

EXAMPLE 4

The experimental procedure in this example was substantially the same as in Example 1 except that the stirrers in the first and second reactors were rotated at velocities of 140 rpm and 180 rpm, respectively. Table 1 below also shows the results obtained in the evaluation tests of the thus obtained resin composition.

EXAMPLE 5

The experimental procedure in this example was substantially the same as in Example 4 except that the styrene-butadiene copolymer as the rubbery polymer in the polymerization mixture was replaced with the same amount of a polybutadiene (NF-35AS, a product by Asahi Chemical Industry Co.), the polymerization mixture introduced into the first polymerization reactor was admixed with 0.03% by weight of 1,1-bis(tert-butylperoxy)-3,3,5-trimethyl cyclohexane as a polymerization initiator and the temperature in the first polymerization reactor was 115° C. instead of 140° C. The conversion of the styrene monomer into polymer in the polymerization mixture discharged out of the first and third reactors was 24% and 76%, respectively. Table 1 below also shows the results obtained in the evaluation tests of the thus obtained resin composition.

EXAMPLE 6

The experimental procedure in this example was substantially the same as in Example 1 except that the styrene monomer in the polymerization mixture was replaced with the same amount of a 75:25 by weight mixture of styrene and acrylonitrile, the polymerization mixture introduced into the first polymerization reactor was admixed with 0.03% by weight of 1,1-bis(tert-butylperoxy)-3,3,5-trimethyl cyclohexane as a polymerization initiator and the temperature in the first polymerization reactor was 115° C. instead of 140° C. The conversion of the monomers into polymer in the polymerization mixture discharged out of the first and third reactors was 28% and 77%, respectively. Table 1 below also shows the results obtained in the evaluation tests of the thus obtained resin composition.

COMPARATIVE EXAMPLES 1 AND 2

The experimental procedure in each of Comparative Examples 1 and 2 was substantially the same as in Example 1 except that the temperature in the devolatilization treatment was 295° C. and 225° C. respectively. Table 1 below also shows the results obtained in the

REFERENCE EXAMPLE 1

The experimental procedure in this reference example was substantially the same as in Example 6 except that the monomer mixture was a 50:50 by weight mixture of styrene and acrylonitrile instead of the 75:25 by weight mixture. Table 1 below also shows the results obtained in the evaluation tests of the thus obtained resin composition.

TABLE 1

|  | Rubber particles | | | Mechanical properties | | |
|---|---|---|---|---|---|---|
|  | Average diameter, $\mu m$ | Peripheral parameter, $(\mu m)^{-1} \cdot (\%$ by weight$)^{-1}$ | Relaxation time, $\mu$ seconds | Surface gloss | Planar *) impact strength, % | Melt index MI, g/10 minutes |
| Example | | | | | | |
| 1 | 0.32 | 0.81 | 1320 | 96 | 100 | 3.8 |
| 2 | 0.43 | 0.86 | 380 | 95 | 90 | 3.2 |
| 3 | 0.23 | 0.75 | 1860 | 97 | 90 | 3.6 |
| 4 | 0.10 | 2.32 | 1590 | 99 | 80 | 3.5 |
| 5 | 0.86 | 0.28 | 740 | 93 | 80 | 3.3 |
| 6 | 0.44 | 1.08 | 1140 | 95 | 100 | 2.2 |
| Comparative Example | | | | | | |
| 1 | 0.40 | 1.02 | 270 | 95 | 30 | 3.1 |
| 2 | 0.48 | 0.65 | 2160 | 94 | 30 | 2.2 |
| 3 | 1.25 | 0.07 | 1820 | 83 | 0 | 3.5 |
| 4 | 0.06 | 3.47 | 1710 | 99 | 0 | 3.8 |
| Reference Example | | | | | | |
| 1 | 0.36 | 1.42 | 440 | not moldable due to poor flowability | | |

*) % of undestroyed among 10 test pieces evaluation tests of the thus obtained resin compositions.

COMPARATIVE EXAMPLE 3

The experimental procedure in this comparative example was substantially the same as in Example 4 except that the styrene-butadiene copolymer as the rubbery polymer in the polymerization mixture was replaced with the same amount of a polybutadiene (NF-35AS, a product by Asahi Chemical Industry Co.). Table 1 below also shows the results obtained in the evaluation tests of the thus obtained resin composition.

COMPARATIVE EXAMPLE 4

The experimental procedure in this comparative example was substantially the same as in Example 1 except that the stirrers in the first and second reactors were rotated at velocities of 180 rpm and 220 rpm, respectively. Table 1 below also shows the results obtained in the evaluation tests of the thus obtained resin composition.

What is claimed is:

1. A rubber-modified styrene-based resin composition comprising a styrene-based resin as a continuum of the matrix phase, wherein said styrene-based resin composition is selected from the group consisting of vinyl aromatic homopolymers and copolymers of vinyl aromatic monomers with copolymerizable monomers, and a diene rubber polymer as a dispersed particulate phase in the matrix, in which the particles of the rubbery polymer have an average particle diameter in the range from 0.08 to 1 $\mu m$, peripheral parameter in the range from 0.1 to 2.5 $(\mu m)^{-1} \cdot (\%$ by weight$)^{-1}$ and relaxation time $T_2$ in the range from 300 to 2000 $\mu$ seconds.

2. The rubber-modified styrene-based resin composition as claimed in claim 1 wherein the styrene-based resin is a homopolymer of styrene or a copolymer of styrene and acrylonitrile in which the weight fraction of the acrylonitrile moiety does not exceed 45%.

3. The rubber-modified styrene-based resin composition as claimed in claim 1 consisting of from 70 to 95% by weight of the styrene-based resin and from 30 to 5% by weight of the diene rubbery polymer.

* * * * *